US012044173B1

(12) United States Patent
Sgouromitis et al.

(10) Patent No.: US 12,044,173 B1
(45) Date of Patent: Jul. 23, 2024

(54) ENGINE EXHAUST REVERSE FLOW PREVENTION

(71) Applicant: PRATT & WHITNEY CANADA CORP., Longueuil (CA)

(72) Inventors: John Sgouromitis, Dorval (CA); Kashif Mohammed, Brossard (CA); Sylvain Lamarre, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/309,153

(22) Filed: Apr. 28, 2023

(51) Int. Cl.
*F02C 7/18* (2006.01)
*F02C 9/20* (2006.01)

(52) U.S. Cl.
CPC ............... *F02C 7/185* (2013.01); *F02C 9/20* (2013.01); *F05D 2220/323* (2013.01); *F05D 2260/213* (2013.01); *F05D 2270/3013* (2013.01)

(58) Field of Classification Search
CPC .... F02C 7/057; F02C 9/18; F02C 9/20; F05D 2220/323; F16K 15/034; F16K 15/033; F16K 15/03
See application file for complete search history.

(56) References Cited

U.S. PATENT DOCUMENTS

| | | |
|---|---|---|
| 4,203,566 A | 5/1980 | Lord |
| 7,040,576 B2 | 5/2006 | Noiseux et al. |
| 8,434,692 B2 | 5/2013 | Scott |
| 8,485,222 B2 | 7/2013 | Restivo |
| 8,833,053 B2 | 9/2014 | Chir |
| 9,267,390 B2 | 2/2016 | Lo |
| 9,903,274 B2 | 2/2018 | Diaz |
| 10,563,936 B2 | 2/2020 | Tajiri |
| 10,590,799 B2 | 3/2020 | Zebian |
| 10,739,086 B2 | 8/2020 | Aouizerate |
| 11,060,462 B2 | 7/2021 | Fert et al. |
| 2008/0095615 A1* | 4/2008 | Bradbrook ............. F02C 7/275 415/145 |
| 2009/0175718 A1 | 7/2009 | Diaz |
| 2011/0030337 A1 | 2/2011 | Mons |
| 2012/0168115 A1 | 7/2012 | Raimarckers |
| 2014/0145008 A1 | 5/2014 | Webster |
| 2019/0153952 A1* | 5/2019 | Niergarth ................ F02C 7/14 |
| 2019/0162203 A1* | 5/2019 | Shinde ..................... F02C 7/18 |

* cited by examiner

*Primary Examiner* — Todd E Manahan
*Assistant Examiner* — Rodolphe Andre Chabreyrie
(74) *Attorney, Agent, or Firm* — Norton Rose Fulbright Canada LLP

(57) ABSTRACT

A cover system selectively allows a gas flow through a heat exchanger duct upstream of an exhaust duct in an aircraft engine. A fluid is at a first pressure during an engine operating condition and a second pressure lower than the first during shutdown. A plate extends across the heat exchanger duct with aperture(s) extending therethrough. A closure is movable between an open position with gas flowing through the apertures into the exhaust duct, and a closed position with the closure closing the apertures. A biasing member operatively connected to the closure closes the closure with a biasing force. During the engine operating condition, the first pressure creates a first force acting against and greater than the biasing force to urge the closure open. At shutdown, the second pressure creates a second force acting against and lower than the biasing force, the biasing force biasing the closure closed.

15 Claims, 11 Drawing Sheets

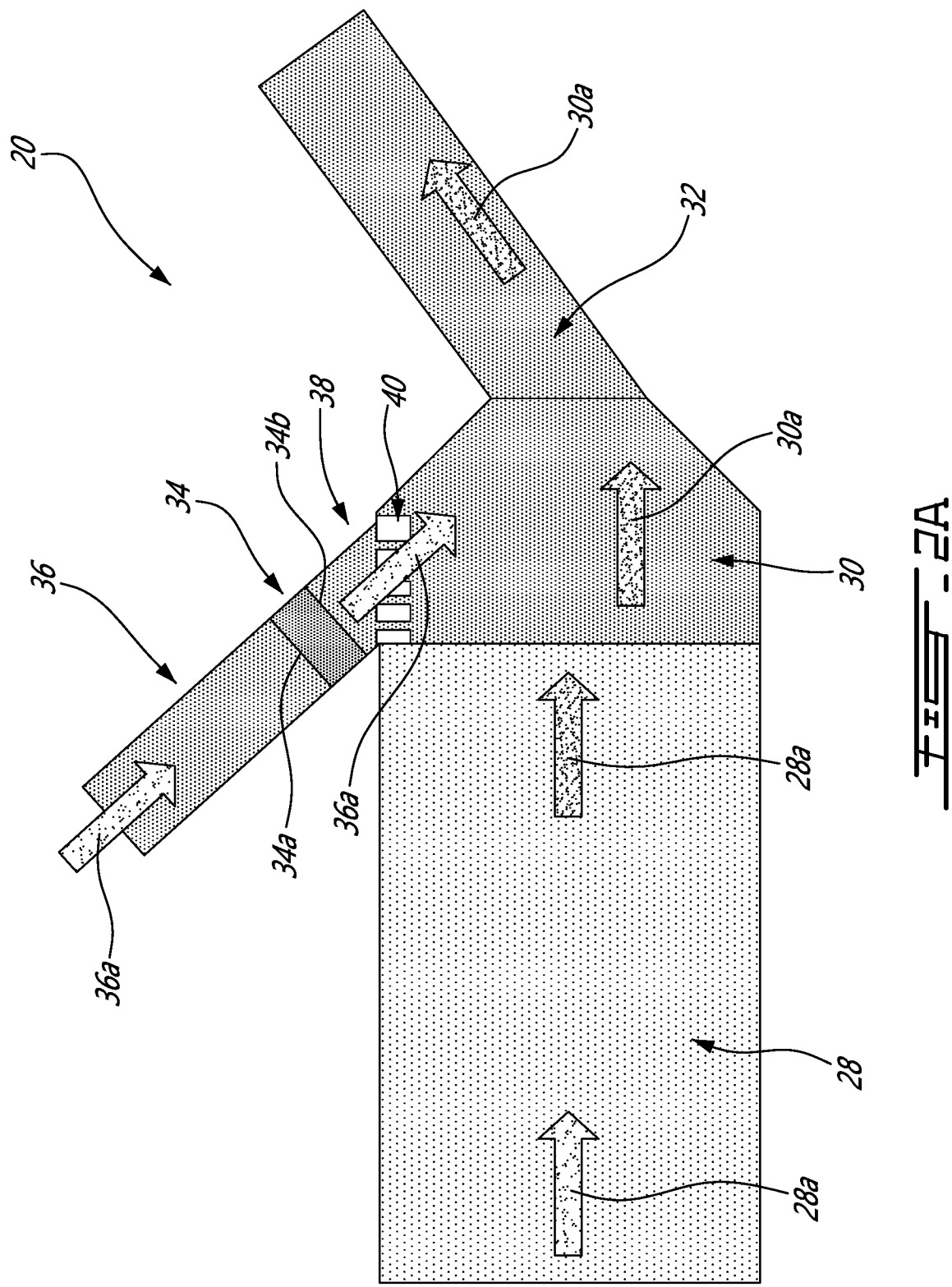

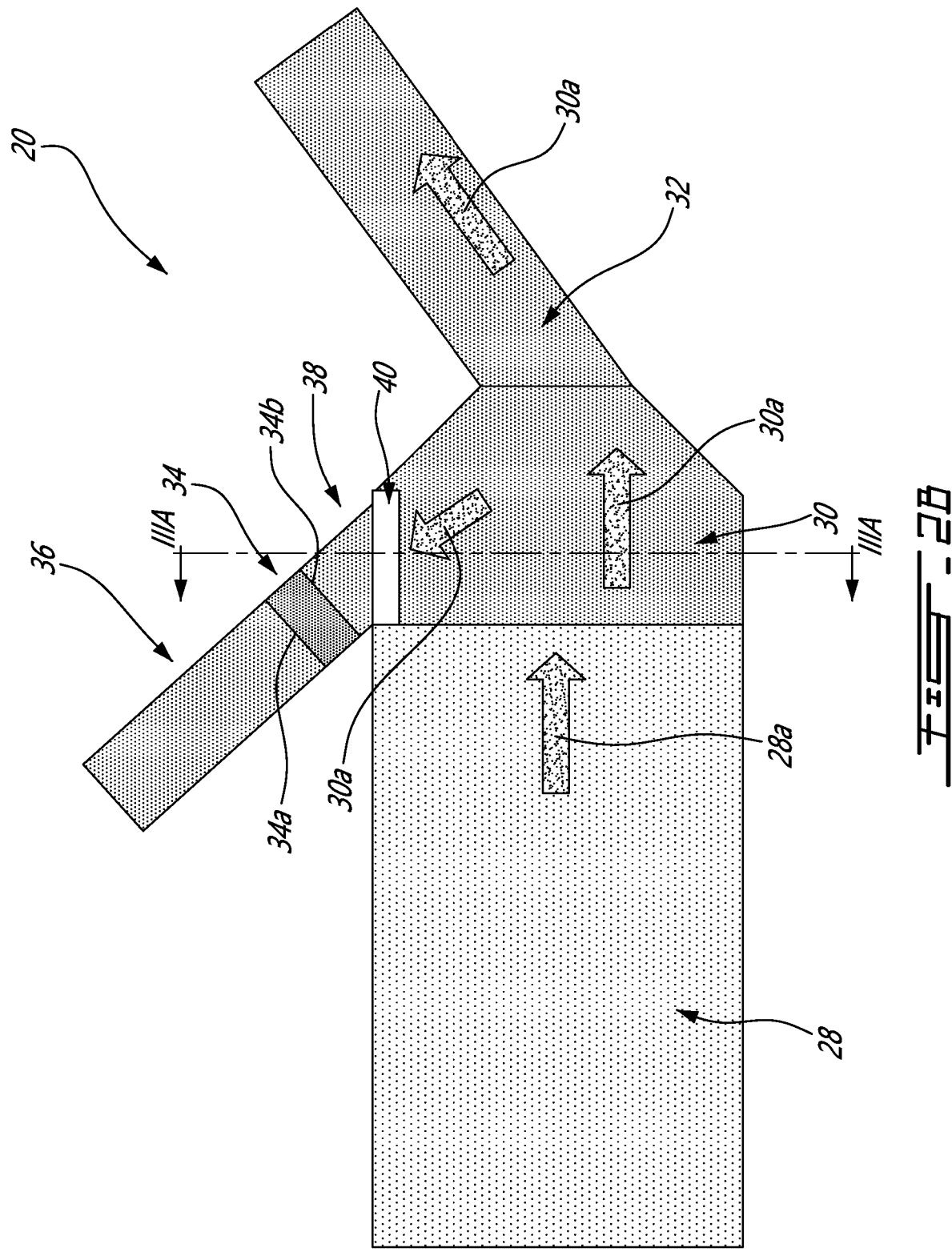

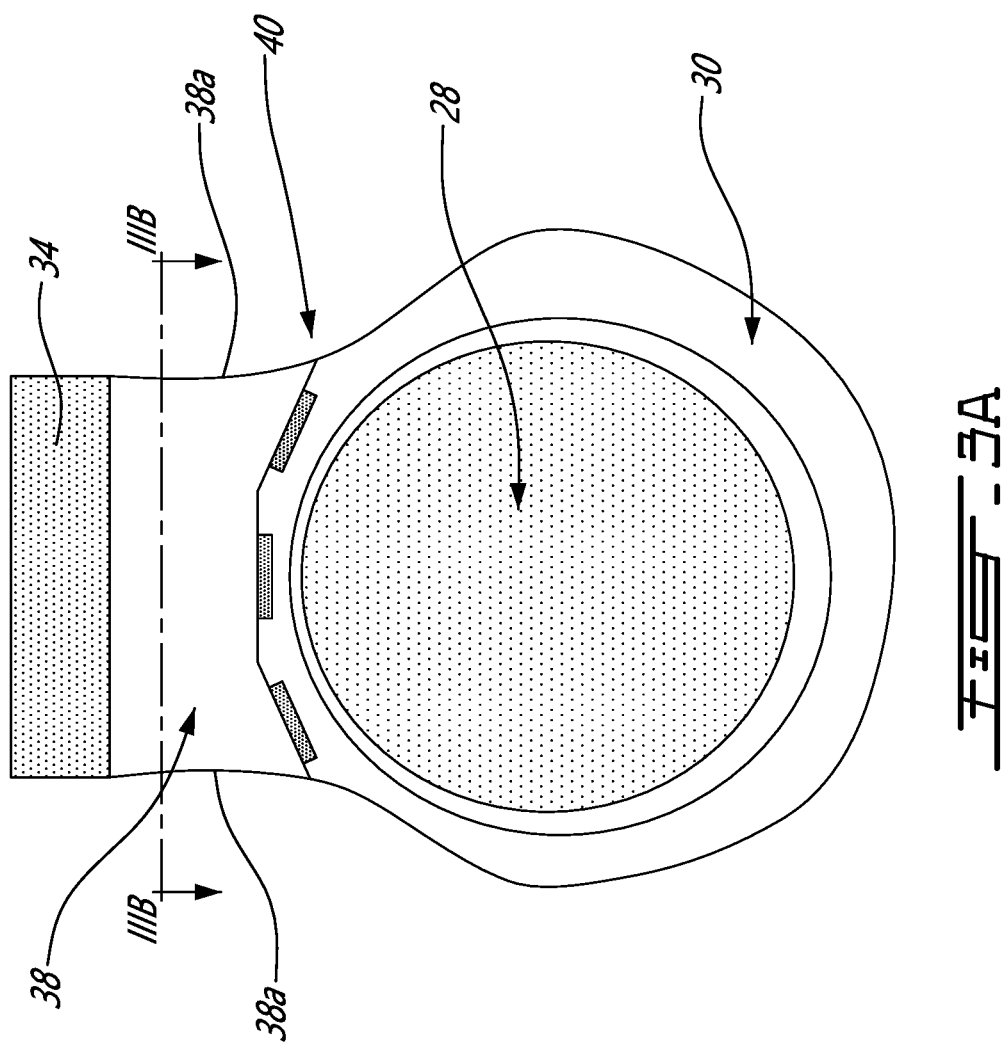

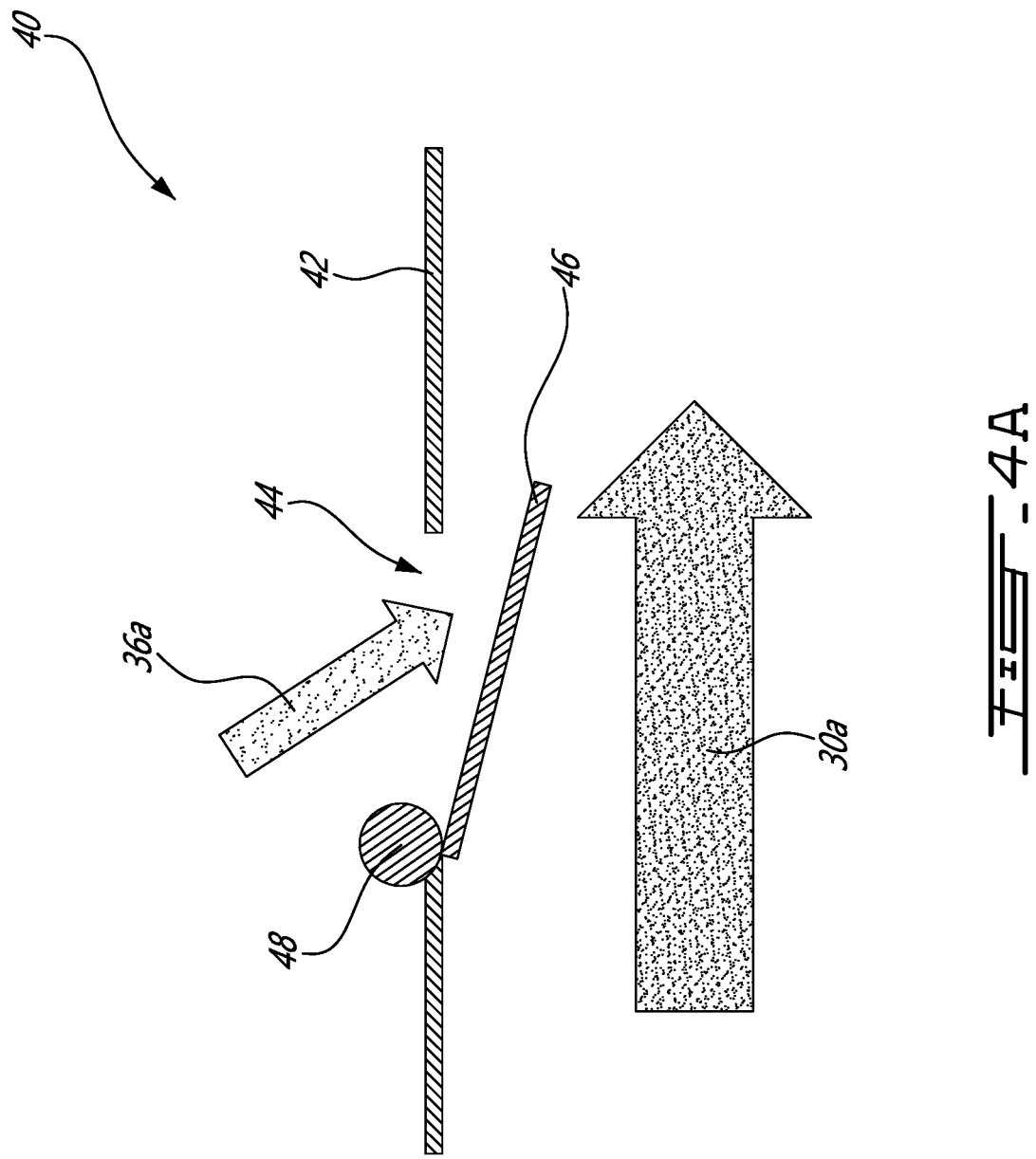

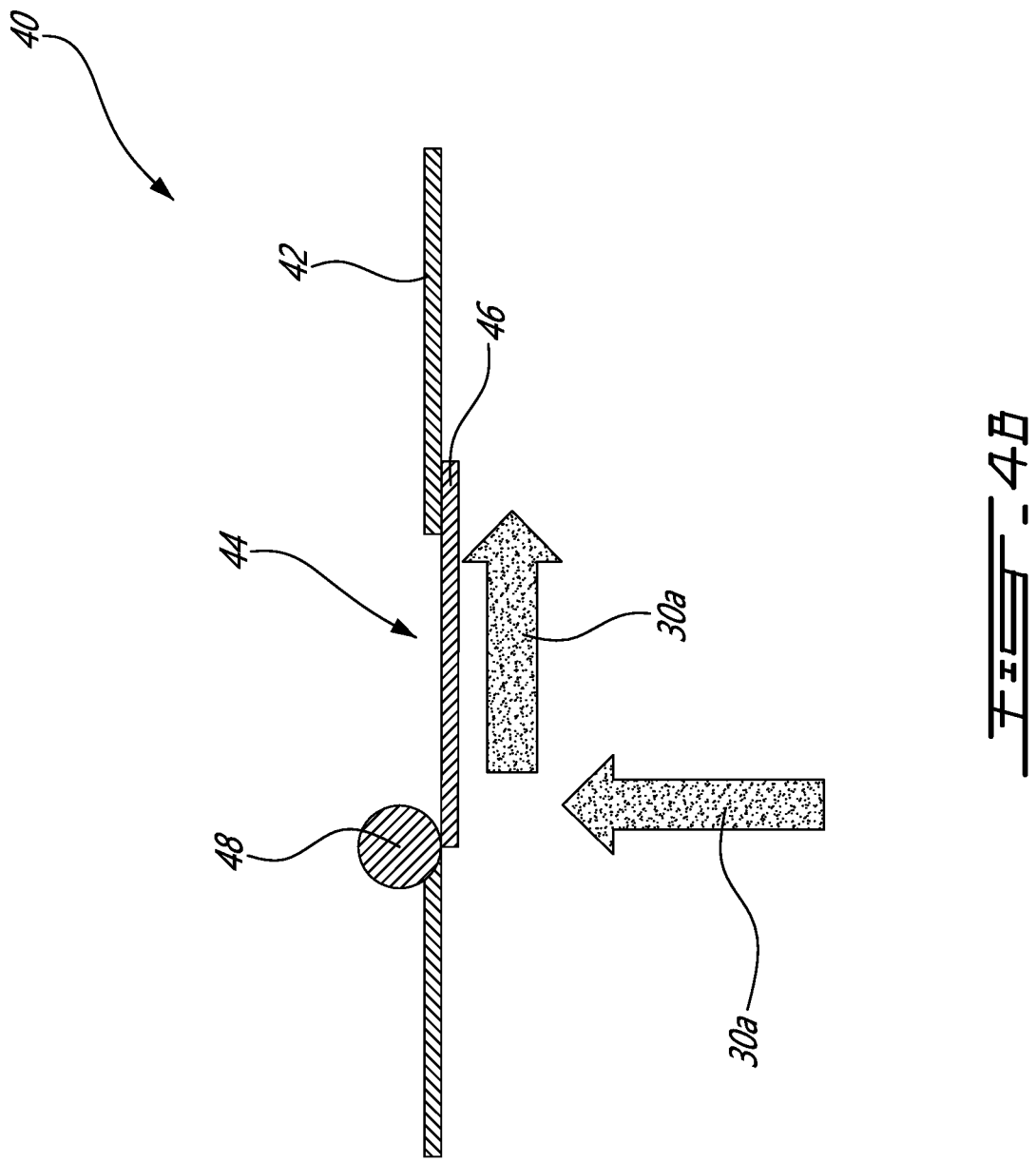

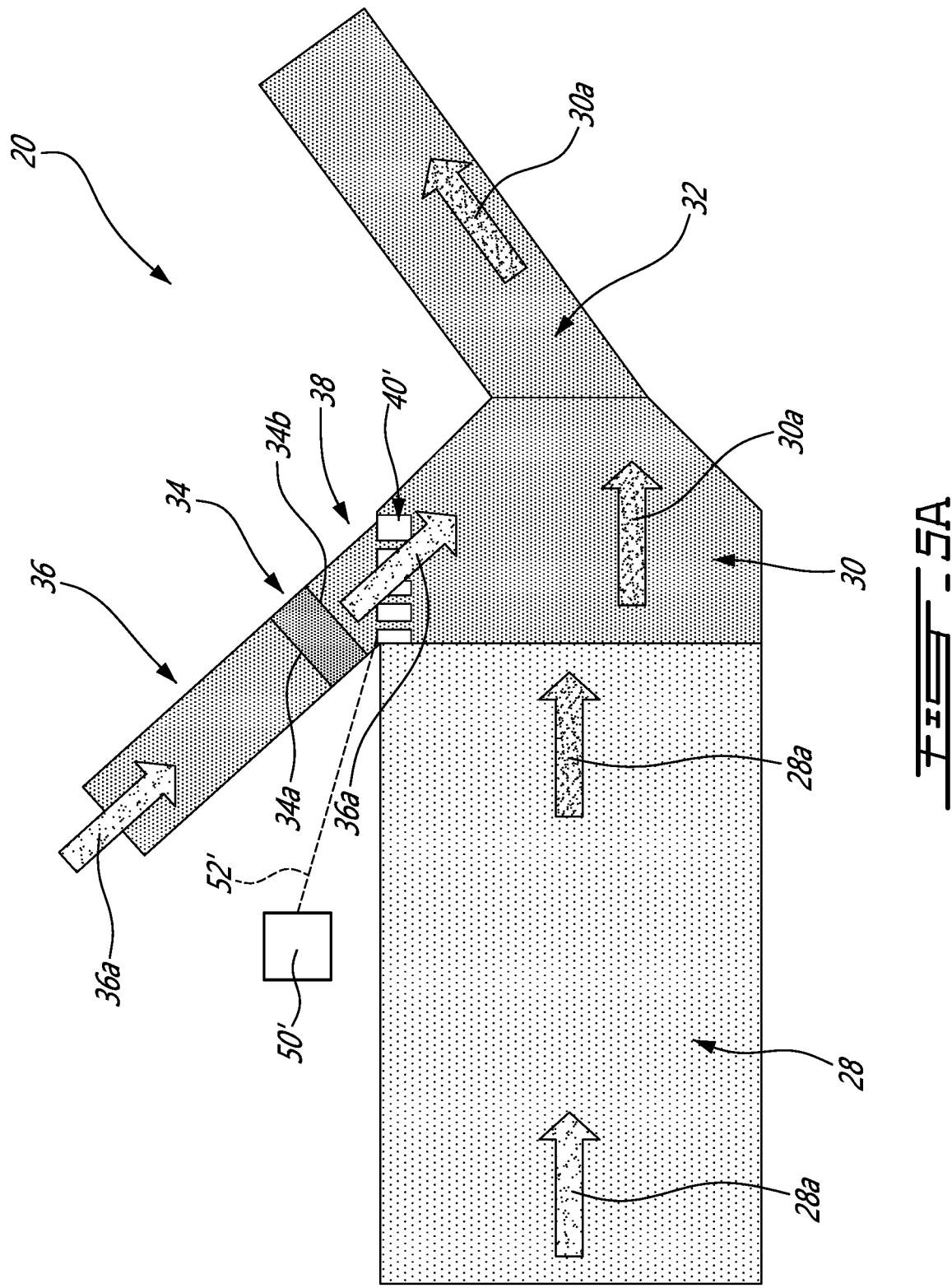

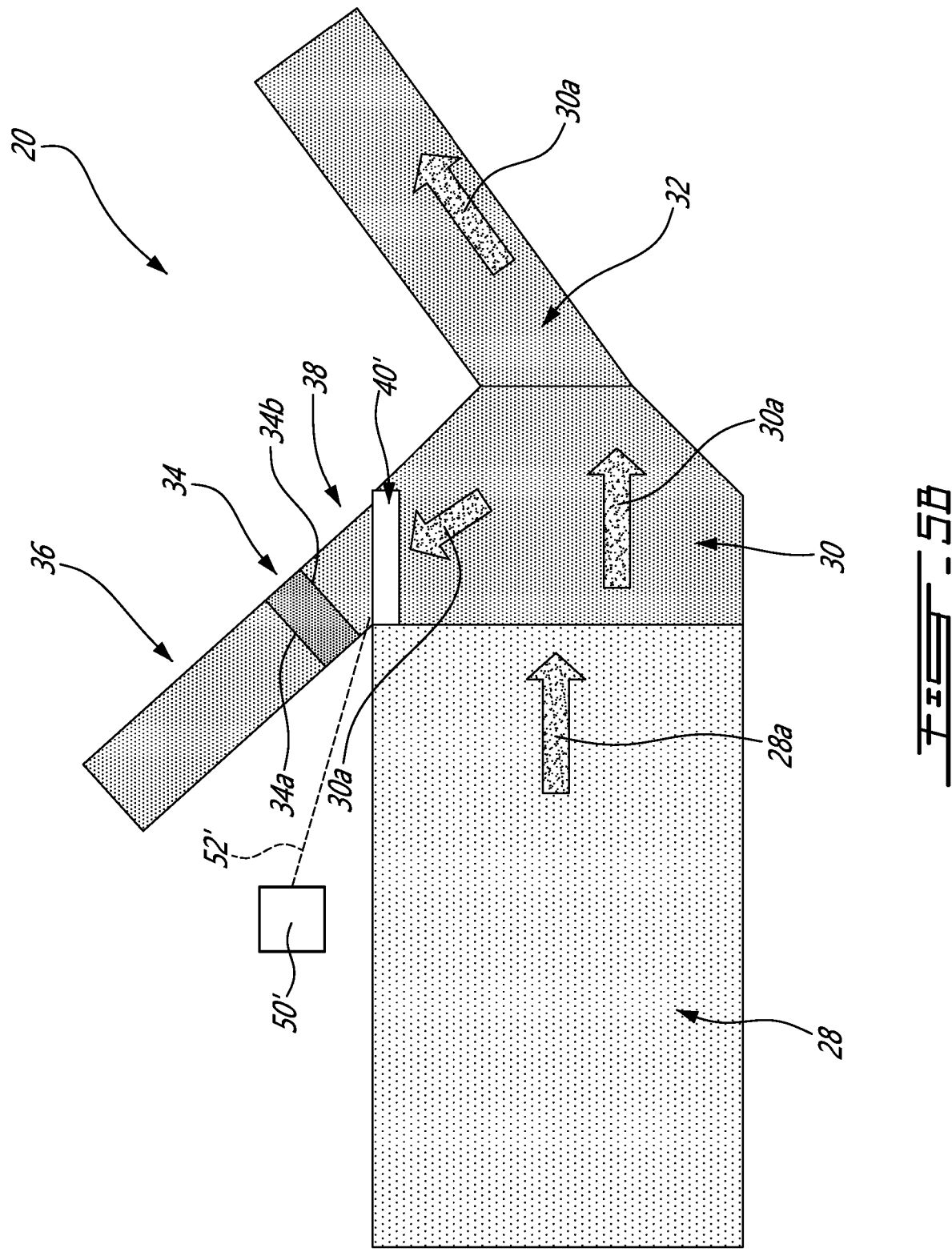

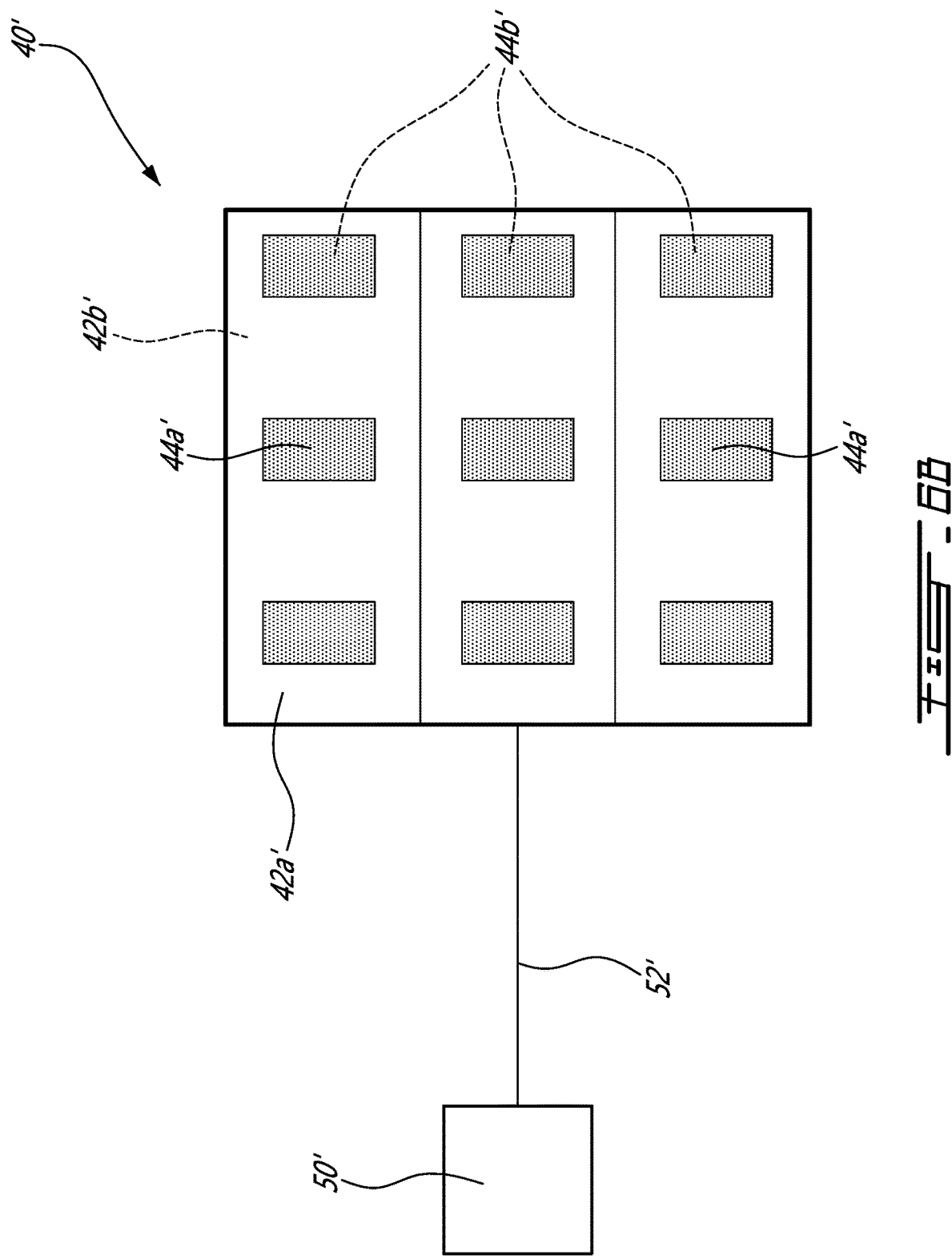

ENGINE EXHAUST REVERSE FLOW PREVENTION

TECHNICAL FIELD

The disclosure relates generally to aircraft engines, and more particularly, to exhaust flow management in aircraft engines.

BACKGROUND

In some aircraft engines, a duct for an air-cooled heat exchanger has its outlet coupled to the engine's exhaust duct. As such, the core gas path flowing through the exhaust duct can draw ambient air through the heat exchanger duct. When the engine shuts down and the airflow through the main engine gas path stops, remaining hot exhaust gas in the exhaust duct may vent outwards through the heat exchanger duct. If the heat exchanger includes temperature-sensitive materials such as aluminum, it may be susceptible to temperature-related damage due to the hot exhaust gas flowing therethrough. Improvements are therefore desired.

SUMMARY

In one aspect, there is provided an aircraft engine, comprising: an exhaust duct receiving a gas flow during an operating condition of the aircraft engine; a source of pressurized fluid being at a first pressure during the operating condition of the aircraft engine and at a second pressure during a shutdown condition of the aircraft engine, the second pressure being lower than the first pressure; a heat exchanger duct having an air inlet receiving a flow of cooling air and an air outlet fluidly connected to the exhaust duct; an air-cooled heat exchanger disposed in the heat exchanger duct between the air inlet and the air outlet; and a cover disposed in the heat exchanger duct downstream of the air-cooled heat exchanger relative to the flow of the cooling air from the air inlet to the air outlet, the cover including: a plate extending across the heat exchanger duct and having one or more apertures extending through the plate; a closure movable between an open position to fluidly connect the heat exchanger duct to the exhaust duct, and a closed position to fluidly disconnect the heat exchanger duct from the exhaust duct; and a biasing member operatively connected to the closure biasing the closure toward the closed position with a biasing force, a first force generated on the closure by the source of pressurized fluid at the first pressure being greater than a second force generated on the closure by the source of pressurized fluid at the second pressure, the first and second forces opposing the biasing force, the biasing force being greater than the second force and less than the first force.

In another aspect, there is provided a cover system for selectively allowing a flow of gas through a heat exchanger duct upstream of an exhaust duct in an aircraft engine, the heat exchanger duct including an air-cooled heat exchanger disposed therein, comprising: a source of a pressurized fluid being at a first pressure during an operating condition of the aircraft engine and at a second pressure during a shutdown condition of the aircraft engine, the second pressure being lower than the first pressure; a plate extending across the heat exchanger duct and having one or more apertures extending through the plate; a closure movable between an open position in which the closure allows the flow of gas through the one or more apertures into the exhaust duct, and a closed position in which the closure closes the one or more apertures; and a biasing member operatively connected to the closure and biasing the closure towards the closed position with a biasing force; wherein, during the operating condition of the aircraft engine, the first pressure of the pressurized fluid creates a first force acting against the biasing force of the biasing member, the first force being greater than the biasing force to urge the closure into the open position; and during the shutdown condition of the aircraft engine, the second pressure of the pressurized fluid creates a second force acting against the biasing force, the biasing force being greater than the second force to bias the closure into the closed position.

In a further aspect, there is provided a method of operating an aircraft engine, comprising: operating the aircraft engine in a powered mode that includes passing a gas through a heat exchanger toward an exhaust duct of the aircraft engine; and transitioning the aircraft engine from the powered mode into shut down, the transitioning including preventing exhaust gas from flowing from the exhaust duct towards the heat exchanger by actuating a component disposed fluidly between the heat exchanger and the exhaust duct of the aircraft engine.

BRIEF DESCRIPTION OF THE DRAWINGS

Reference is now made to the accompanying figures in which:

FIG. 2A is a schematic cross sectional view of an exhaust section of the engine of FIG. 1 in a first engine operational mode;

FIG. 2B is a schematic cross sectional view of an exhaust section of the engine of FIG. 1 in a second engine operational mode;

FIG. 3A is a cross sectional view of the exhaust section shown in FIG. 2B taken along line IIIA-IIIA;

FIG. 4A is an enhanced schematic cross sectional view of a heat exchanger duct cover for the engine in the first engine operational mode;

FIG. 4B is an enhanced schematic cross sectional view of a heat exchanger duct cover in for the engine the second engine operational mode;

FIG. 5A is a schematic cross sectional view of an exhaust section of the engine of FIG. 1 in a first engine operational mode according to another embodiment;

FIG. 5B is a schematic cross sectional view of an exhaust section of the engine of FIG. 1 in a second engine operational mode according to the another embodiment;

FIG. 6B is an enhanced schematic cross sectional view of a heat exchanger duct cover in for the engine the second engine operational mode according to the another embodiment.

DETAILED DESCRIPTION

Figure 1:
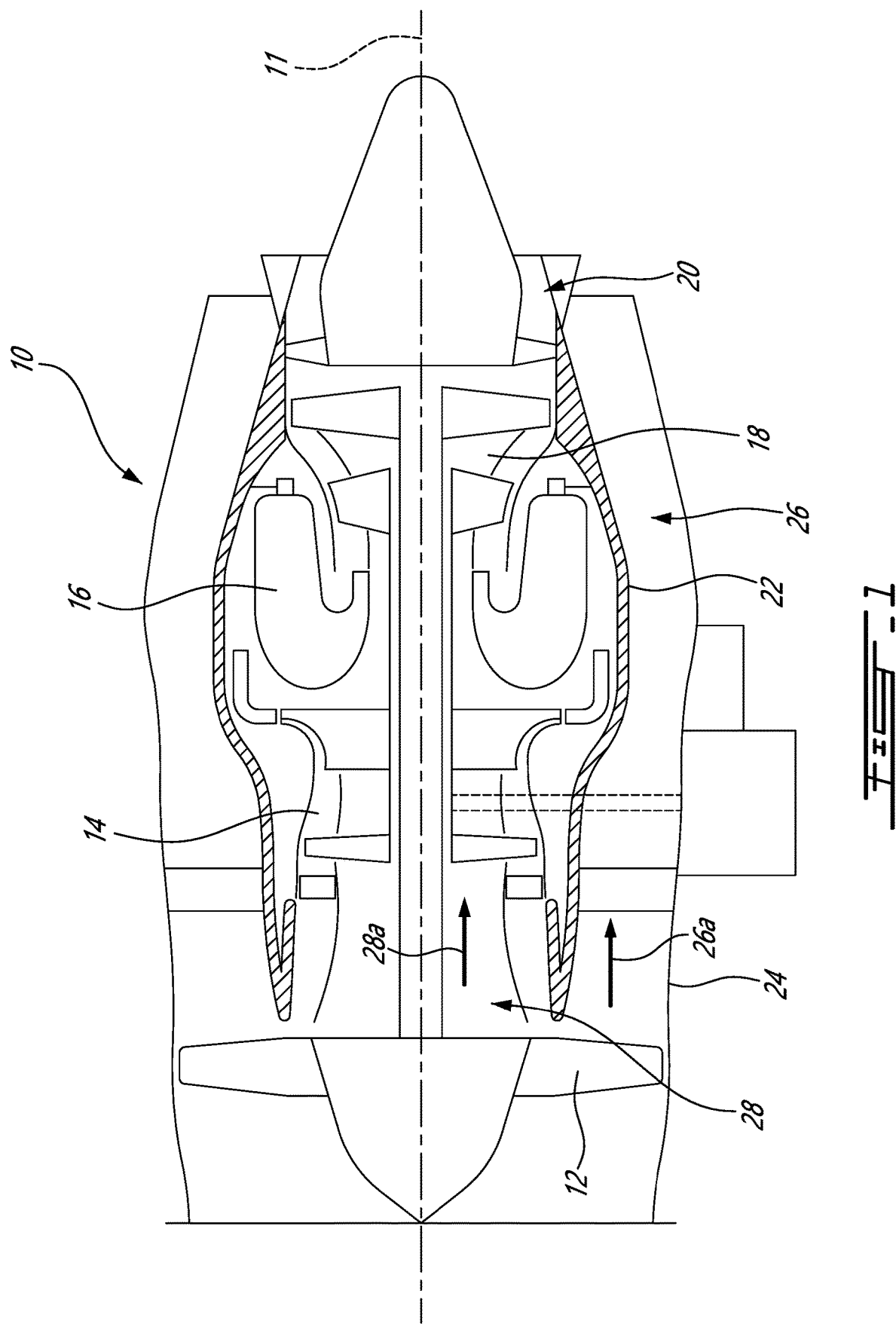
FIG. 1 is a schematic cross sectional view of a gas turbine engine.

FIG. 1 illustrates a gas turbine engine 10 of a type preferably provided for use in subsonic flight, generally comprising in serial flow communication, along central longitudinal axis 11, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Engine 10 further includes an exhaust section 20 where hot combustion gases are expelled. While FIG. 1 depicts engine 10 as a turbofan-type gas turbine engine, the present disclosure may relate to other types of aircraft engines, such as turboprop engines, turboshaft engines, as well as hybrid-electric engines.

The gas turbine engine 10 includes a first, inner casing 22 which encloses the turbo machinery of the engine, and a second, outer casing 24 extending outwardly of the first casing 22 such as to define an annular bypass passage 26 therebetween, also referred to as a bypass duct or an annular outer passage. The air propelled by the fan 12 is split into a first portion which flows around the first casing 22 within the bypass passage 26, and a second portion which flows through a main gas path 28, also referred to as a core passage, which is defined within the first casing 22 and allows the gas flow to circulate through the multistage compressor 14, combustor 16 and turbine section 18 as described above. A core gas flow 28a is said to flow through the main gas path 28 (also referred to as the core gas path), while a bypass gas flow 26a is said to flow through the bypass passage 26.

Referring additionally to FIGS. 2A-2B, at the exhaust section 20 at the aft end of the engine 10, the core gas flow 28a and the bypass gas flow 26a are exhausted from the engine 10 through an exhaust duct 30 and an external exhaust 32. In the depicted embodiment, engine 10 further includes an air-cooled heat exchanger 34 disposed adjacent the exhaust duct 30 and in fluid communication therewith. In an embodiment, the air-cooled heat exchanger 34 is an air-cooler oil cooler, in which warm engine oil is operable to transfer heat to the cool air flowing therethrough. Other types of air-cooled heat exchangers may be contemplated. In particular, the air-cooled heat exchanger 34 receives cooling airflow 36a via an air inlet duct 36, and exhausts the cooling airflow 36a into the exhaust duct 30 via an air outlet duct 38. The air-cooled heat exchanger 34 includes an inlet 34a receiving the cooling airflow 36a from the inlet duct 36 and an outlet 34b for expelling the cooling airflow 36b through the outlet duct 38 towards the exhaust duct 30. The inlet duct 36 and outlet duct 38 may collectively be referred to as a heat exchanger duct. The cross-sectional shape of the heat exchanger duct may vary, for instance circular, square or rectangular.

In the embodiment shown in FIGS. 2A-2B, a cover 40 is disposed in the outlet duct 38 downstream of the air-cooled heat exchanger 34, in particular downstream of the outlet 34b of the air-cooled heat exchanger 34. Also referred to as a baffle, the cover 40 includes a closure that is movable or displaceable between an open position (shown in FIG. 2A), in which the cover 40 allows air from the air-cooled exchanger 34 to flow through the outlet duct 38 and into the exhaust duct 30, and a closed position (shown in FIG. 2B), in which the cover 40 substantially blocks the air outlet 38. As will be discussed in further detail below, the cover 40 is movable between the open and closed positions or configurations based on an alteration of an operational condition or state of the engine 10. Stated differently, the cover 40 may assume its open position in an engine operational condition (i.e., when then engine 10 is running) and may assume its closed position in an engine shutdown state. As will be discussed in further detail below, the position of the cover 40 (and thus the operating condition of the engine 10) may correspond to the presence or absence of a cooling airflow 36a flowing through the air-cooled heat exchanger 34 towards the exhaust duct 30. The flow rate of the cooling airflow 36a, and thus the air pressure of the cooling airflow 36a, may cause the cover 40 to open or close. Other engine airflows may directly or indirectly affect the open or closed positions of the cover 40, as will be discussed in further detail below. The cover 40 may therefore be referred to as a passive cover 40, as its operation (i.e., its movement between positions) is based on surrounding airflow(s). Advantageously, the closed position of the cover 40 may prevent hot gasses (i.e., exhaust flow 30a) from flowing upstream into the outlet duct 38 and through the air-cooled heat exchanger 34 (also referred to as a soak-back condition), which may be susceptible to temperature-related damage such as melting or burning.

FIG. 2A illustratively depicts the engine 10 in an operational or running state or condition. Stated differently, the core gas flow 28a flows through the main gas path 28, i.e., through the compressor section 14, combustor 16 and turbine section 18 towards the exhaust section 20 for evacuation from the engine 10, illustratively via external exhaust 32. As the core gas flow 28a passes through the exhaust duct 30, an eductor effect may occur, whereby a cooling airflow 36a is drawn from a cooling airflow source (not shown), through the inlet duct 36 and through the air-cooled heat exchanger 34 before entering the exhaust duct 30 via the outlet duct 38. The cooling airflow source may be, for instance, the bypass gas flow 26a in the bypass passage 26, or ambient air surrounding the engine 10. In some cases, in addition to or instead of flowing via an eductor effect, the cooling airflow 36a may be forcibly driven through the air-cooled heat exchanger 34 towards the exhaust duct 30. The cooling airflow 36a exiting the air-cooled heat exchanger 34 may be at a flow rate above a predetermined flow rate required to maintain the cover 40 in its open position, as will be discussed in further detail below. As such, while the engine 10 is in its operational state and the cooling airflow 36a is flowing through the inlet duct 36, the air-cooled heat exchanger 34 and the outlet duct 38 towards the exhaust duct 30, the cover 40 may be maintained in its open position.

FIG. 2B illustratively depicts the engine 10 in a non-operational or non-running state or condition, for instance after an engine shutdown procedure or condition. Stated differently, the core gas flow 28a is no longer actively flowing through the main gas path 28. Remaining or lingering core gas flow 28a, and exhaust flow 30a, may remain to be evacuated. As the core gas flow 28a and exhaust flow 30a are no longer actively flowing, there may no longer be a strong enough flow to create an eductor effect for drawing the cooling airflow 36a through the air-cooled heat exchanger 34. In addition, in the depicted embodiment, the outlet duct 38 is disposed above, i.e., in an upward direction from, the exhaust duct 30 relative to the longitudinal axis 11. As such, the hot exhaust flow 30a may attempt to evacuate from the exhaust duct 30 upwardly via the outlet duct 38 instead of or in addition to via the external exhaust 32. In other cases, the outlet duct 38 may be disposed adjacent or alongside the exhaust duct 30 relative to the longitudinal axis 11. In such a configuration, the adjacent outlet duct 38 may still provide a possible passageway for the hot exhaust flow 30a to evacuate from the exhaust duct 30. In some embodiments, the air-cooled heat exchanger 34 may be a temperature-sensitive component, i.e., it includes one or more materials (e.g., aluminum) that are susceptible to damage (e.g., burning or melting) when exposed to excess heat. As such, the predetermined flow rate of the flowing cooling airflow 36a may be set to a flow rate indicative of the engine 10 entering a shutdown phase, such that the cover 40 will transition to its closed position as the flow rate of the flowing cooling airflow 36a decreases, thereby preventing the hot exhaust flow 30a from traveling upstream through the outlet duct 38 towards the air-cooled heat exchanger 34. Heat-related damage to the air-cooled heat exchanger 34 due to exposure to the hot exhaust flow 30a may thus be prevented.

In an exemplary embodiment, the core gas flow 28a exiting the main gas path 28 and the exhaust flow may be at temperatures of around 1000 degrees Fahrenheit. If such gases were to flow upstream into the outlet duct 38, they may melt, burn or otherwise damage one or more components of the air-cooled heat exchanger 34. In addition, the various tubes and fittings joining the air-cooled heat exchanger 34 to the heat exchanger duct may be susceptible to high temperature-related damage. The closing of the cover 40, for instance upon a decrease in flow rate of the cooling airflow 36a, may prevent such damage.

Referring to FIGS. 3A-4B, a cover 40 according to an embodiment of the present disclosure is shown. The cover 40 is illustratively disposed in the outlet duct 38 downstream of the air-cooled heat exchanger 34 and upstream of the exhaust duct 30 (see FIGS. 2A-2B). The location of the cover 40 within the outlet duct 38 may vary. For instance, in the embodiment shown in FIGS. 2A-2B, the cover 40 is disposed at the downstream end of the outlet duct 38, i.e., where the outlet duct 38 meets the exhaust duct 30. Other locations between the air-cooled heat exchanger 34 and the exhaust duct 30 may be contemplated as well.

Figure 3B:
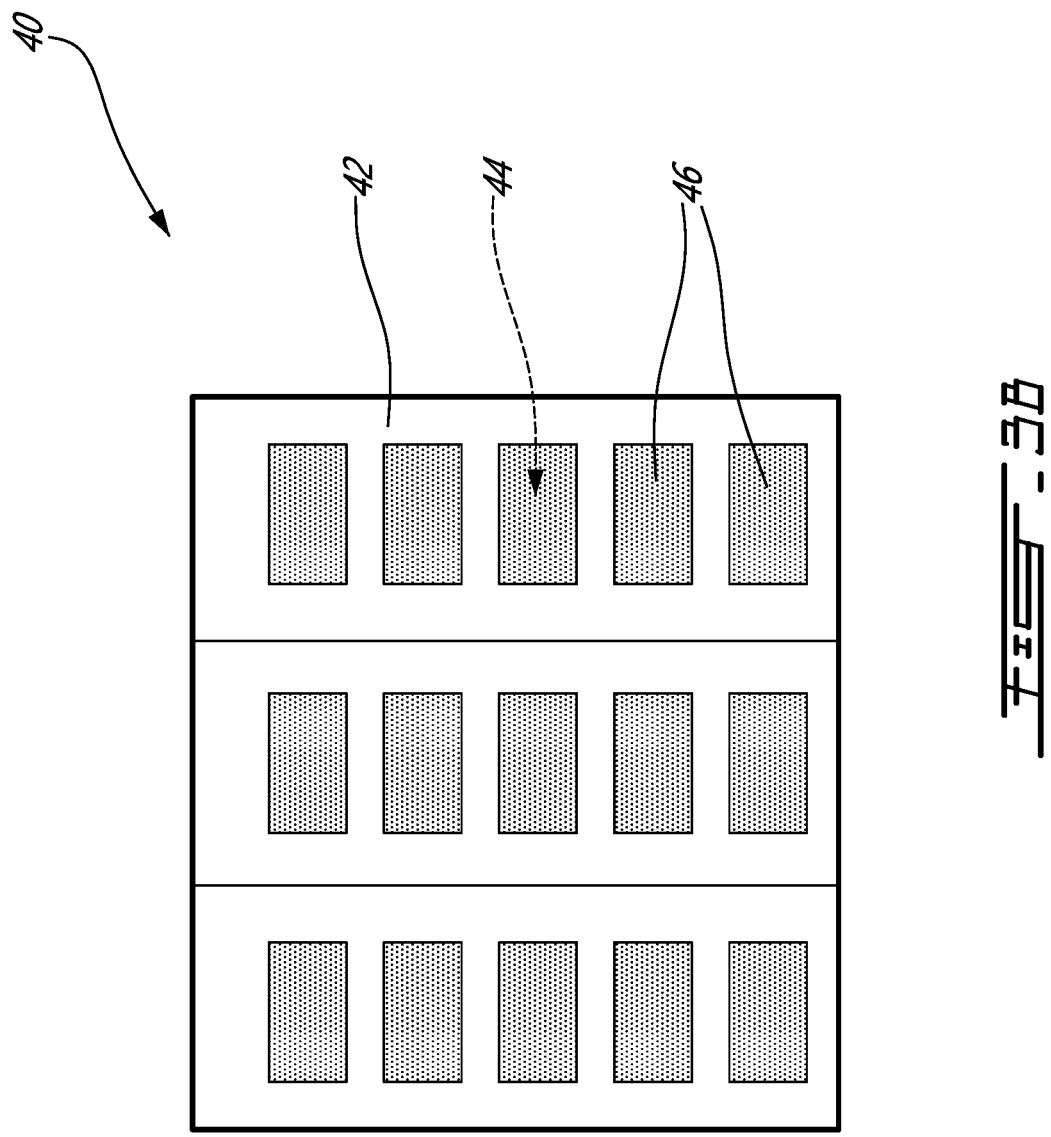
FIG. 3B is a cross sectional view of the exhaust section shown in FIG. 3A taken along line IIIB-IIIB.
Figure 6A:
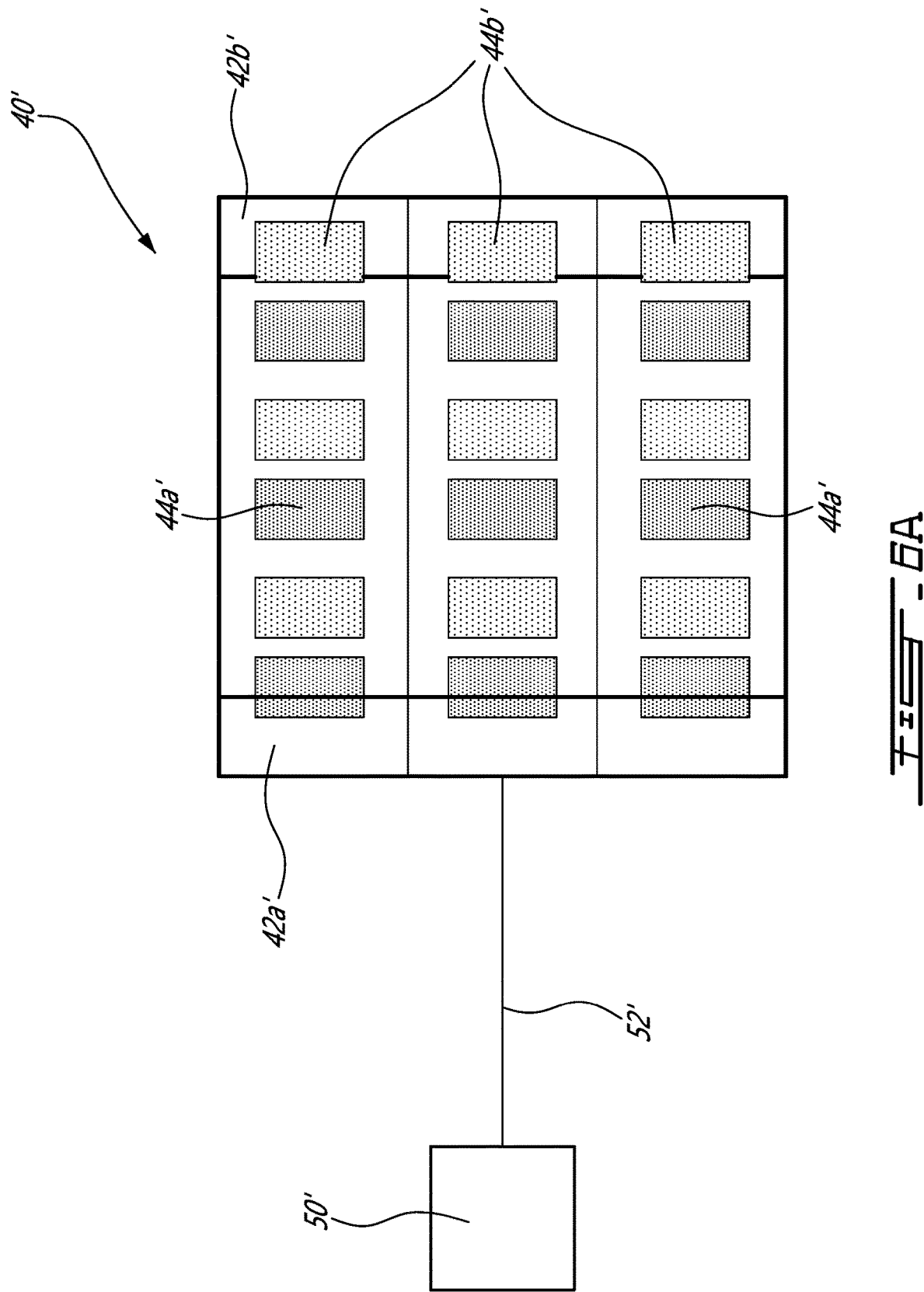
FIG. 6A is an enhanced schematic cross sectional view of a heat exchanger duct cover for the engine in the first engine operational mode according to the another embodiment.

FIG. 4A shows the exemplary cover 40 in its open position or configuration, i.e., where cooling airflow 36A is permitted to flow through the outlet duct 38 towards the exhaust duct 30, while FIGS. 3A, 3B and 4B show the cover 40 in its closed position or configuration, i.e., where exhaust flow 30a in the exhaust duct 30 is prevented from travelling upstream into the outlet duct 38 towards the air-cooled heat exchanger 34. The depicted cover 40 includes a plate 42 extending across the outlet duct 38 from opposite walls 38a of the outlet duct 38. In the shown case, the plate 42 has a bent or curved shape corresponding to a shape of the exhaust duct 30. Stated differently, the plate 42 has a cross-sectional radius equal to a cross-sectional radius of a wall of the exhaust duct 30 relative to the longitudinal axis 11. In other cases, the plate 42 may have other shapes, for instance a flat plate 42 extending transversely across the outlet duct 38 and matching a cross-sectional shape of the outlet duct 38. Other shapes for the plate 42 may be contemplated.

In the shown embodiment, but not necessarily the case in all embodiments, the plate 42 includes a plurality of apertures 44 extending through the plate 42 selectively coverable and uncoverable by a closure such as flaps 46, also referred to as doors. Various numbers of apertures 44 and flaps 46 may be contemplated. For instance, the plate 42 may include one or more apertures 44 and one or more flaps 46. In some cases, the number of apertures 44 may correspond to the number of flaps 46. In other cases, the number of apertures 44 may differ from the number of flaps 46. In the shown case, the apertures 44 and flaps 46 are, respectively, identically sized and shaped. In other cases, varying sizes and shapes for the apertures 44 and flaps 46, as well as their arrangements along the plate 42, may be contemplated. As shown in FIGS. 4A and 4B, the flaps 46 are operatively coupled to the plate 42 by way of a biasing member such as springs 48. The flaps 46 may thus be referred to as spring-loaded flaps 46. In the shown case, the springs 48 are torsion springs operatively coupling the flaps 46 to the plate 42, although other spring types may be contemplated. While in the depicted embodiment the flaps 46 and springs 48 are shown as distinct components, in other cases the closure and biasing member may be integrated, for instance as leaf springs.

In the engine's 10 shutdown condition (see FIGS. 3A, 3B and 4B), little or no cooling airflow 36a flows through the outlet duct 38 towards the exhaust duct 30. The springs 48 are operable to maintain the flaps 46 in their closed position, with no airflow opposing the force of the springs 48. Stated differently, a force created by the pressure of a pressurized fluid (in this case cooling airflow 36a) in the engine's shutdown condition acting against the biasing force of the biasing member (spring 48) is lower than the biasing force of the biasing member to bias the closure (flap 46) into the closed position. The cover 40 is therefore maintained in its closed position, thereby preventing the hot exhaust flow 30a from traveling upstream in the outlet duct 38 towards the air-cooled heat exchanger 34.

In the engine's 10 operating condition (see FIG. 4A), the cooling airflow 36a is drawn or flowed through the outlet duct 38 towards the exhaust duct 30 (as discussed above). The flow rate of the cooling airflow 36a may create a pressure differential that exerts sufficient force to overcome the force of the springs 48, thereby biasing the flaps 46 into their open position. Stated differently, a force created by the pressure of a pressurized fluid (in this case cooling airflow 36a) in the engine's operating condition acting against the biasing force of the biasing member (spring 48) is greater than the biasing force of the biasing member to bias the closure (flap 46) into the open position. The cooling airflow 36a is therefore allowed to flow unimpededly through the air-cooled heat exchanger 34 into the exhaust duct 30. If the engine were to transition towards a shutdown condition, the flow rate of the cooling airflow 36a will decrease until it can no longer overcome the force of the springs 48, thereby allowing the springs 48 to bias the flaps 46 into their closed position to prevent the hot exhaust flow 30a from traveling upstream in the outlet duct 38 towards the air-cooled heat exchanger 34.

Referring to FIGS. 5A-6B, another embodiment of a cover 40' is shown, with like reference numerals referring to like elements. The location of the cover 40' within the outlet duct 38 may vary. For instance, in the embodiment shown in FIGS. 5A-5B, the cover 40' is disposed at the downstream end of the outlet duct 38, i.e., where the outlet duct 38 meets the exhaust duct 30. Other locations between the air-cooled heat exchanger 34 and the exhaust duct 30 may be contemplated as well. As will be discussed in further detail below, the cover 40' is operable to be moved between an open position and a closed position by way of a module 50' operatively coupled to the cover 40' via a linkage 52'.

The cover 40' includes a first plate 42a' slideably mounted to a second plate 42b'. The first plate 42a' may be referred to as the top plate and the second plate 42b' may be referred to as the bottom plate, as the first plate 42a' is disposed further upstream in the outlet duct 38 that the second plate 42b'. The first plate 42a' includes apertures 44a' extending therethrough, and the second plate 42b' includes apertures 44b' (also referred to as additional apertures) extending therethrough. The number, shape, size and arrangement of apertures 44a', 44b' may vary. In the shown case, the number, shape, size and arrangement of apertures 44a' and 44b' correspond to one another. As such, upon actuation by the module 50' via the linkage 52', the first and second plates 42a', 42b' are slideable with respect to one another so that the first plate 42a' overlaps or covers the apertures 44b' in the second plate 42b' (and the second plate 42b' overlaps or covers the apertures 44a' in the first plate 42b') in the closed position of the cover 40' (see FIGS. 5B and 6B), for instance when the engine 10 is in a shutdown condition, to substantially seal off or block the apertures 44a', 44b' and prevent hot exhaust flow 30a from flowing upstream towards the air-cooled heat exchanger 34. Similarly, upon actuation by the module 50' via the linkage 52', the first and second plates 42a', 42b' are slideable with respect to one another so that the apertures 44a', 44b' align with one another in the open position of the cover 40' (see FIGS. 5A and 6A), for instance in an operating condition of the engine 10, so that the cooling airflow 36a may flow through the aligned apertures 44a', 44b' towards the exhaust duct 30. In some cases, one of the plates (e.g., first plate 42a') may remain fixed while the other plate (e.g., second plate 42b') may be operatively coupled to the linkage 52' and be slideable relative to the first plate 42a'. The opposite arrangement, as well as other arrangements (for instance, where both plates 42a', 42b' are slideable relative to one another) may be contemplated.

As discussed above, the cover 40' is operable to be moved between an open position and a closed position by way of a module 50' operatively coupled to the cover 40' via a linkage 52'. The module 50' may include an actuator, for instance a spring-piston actuator, operatively coupled to the linkage 52' for displacing the plates 42a', 42b' with respect to each other. The module 50' may be actuatable by a flowing airflow, and may thus be disposed in a location of the engine 10 so that it is exposed to an engine airflow.

In an exemplary embodiment, the module 50' may be disposed adjacent to a bleed port or valve of the compressor section 14. As such, when the engine 10 is in an operating state, bleed air flowing from the compressor section 14 actuates the module 50', which may cause the cover 40' to assume its open position. For instance, the flowing bleed air may force a spring piston actuator in the module 50' to compress, thereby displacing the linkage 52' to force the plates 42a', 42b' to displace such that the apertures 44a', 44b' overlap so that they allow the cooling airflow 36a to flow therethrough. Stated differently, a force created by the pressure of a pressurized fluid (in this case the core gas flow 28a) in the engine's operating condition acting against the biasing force of the biasing member (module 50') is greater than the biasing force of the biasing member to bias the closure (plates 42a', 42b' and apertures 44a', 44b') into the open position.

When the engine 10 is in a shutdown state, the flow of bleed air may slow or stop, causing the module 50', via linkage 52', to cause the cover 40' to assume its closed position. For instance, the slowing or stopping of the flowing bleed air may allow the spring piston actuator in the module 50' to decompress or extend, thereby displacing the linkage 52' to force the plates 42a', 42b' to displace such that apertures 44a', 44b' are covered by opposite plates 42a', 42b', thereby preventing hot exhaust flow 30a from traveling upstream into the outlet duct 38 towards the air-cooled heat exchanger 34. Stated differently, a force created by the pressure of a pressurized fluid (in this case the core gas flow 28a) in the engine's operating condition acting against the biasing force of the biasing member (module 50') is lower than the biasing force of the biasing member to bias the closure (plates 42a', 42b' and apertures 44a', 44b') into the closed position. Other locations where the module 50' may be exposed to the core gas flow 28a at a pressure indicative of the engine's operating or shutdown condition may be contemplated. Other types of modules 50' and linkages 52' may be contemplated.

In accordance with the present disclosure, an exemplary method is shown for operating an aircraft engine 10. The aircraft engine 10 is operated in a powered mode that includes passing a gas (e.g., cooling air 36a) through a heat exchanger (e.g., air-cooled heat exchanger 34) towards an exhaust duct 30 of the aircraft engine 10. The aircraft engine 10 is transitioned from the powered mode into shut down, the transitioning including preventing exhaust gas 30a from flowing from the exhaust duct 30 towards the heat exchanger by actuating a component (e.g., cover 40, 40') disposed fluidly between the heat exchanger and exhaust duct 30 of the aircraft engine 10. In some embodiments, operating the aircraft engine 10 in the powered mode further includes preventing actuation of the component by flowing a pressurized fluid against a biasing force associated with the component, and actuating the component includes decreasing a pressure of the pressurized fluid to a predetermined pressure indicative of the transitioning the aircraft engine 10 from the powered mode into shut down.

In various embodiments, the cover 40, 40' may be said to be substantially closed (and the outlet duct 38 substantially sealed), as only a negligible volume of hot exhaust flow 30a is permitted to flow upstream into the outlet duct 38. In other cases, the apertures 44, 44' may be closed in a manner to better seal the outlet duct 38 in the closed position of the cover 40 such that the cover 40 may be said to be sealed in an airtight manner.

It can be appreciated from the foregoing that at least some embodiments have a passive, airflow-based system for preventing hot exhaust gasses from traveling upstream a heat exchanger duct, thereby allowing temperature-sensitive components of the heat exchanger to be protected at engine shutdown.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the cover 40' shown in FIGS. 5A-6B may be displaceable between open and closed positions by way of a module exposed to a flow of engine oil or fuel and actuate based on oil or fuel pressures indicative of the engine 10 being in an operating or shutdown condition. Yet further modifications could be implemented by a person of ordinary skill in the art in view of the present disclosure, which modifications would be within the scope of the present technology.

The invention claimed is:

1. An aircraft engine, comprising:
a combustor;
an exhaust duct receiving a gas flow during an operating condition of the aircraft engine;
a source of pressurized fluid being at a first pressure during the operating condition of the aircraft engine and at a second pressure during a shutdown condition of the aircraft engine, the second pressure being lower than the first pressure;
a heat exchanger duct having an air inlet receiving a flow of cooling air and an air outlet fluidly connected to the exhaust duct at a location downstream of the combustor relative to the gas flow;
an air-cooled heat exchanger disposed in the heat exchanger duct between the air inlet and the air outlet; and a cover disposed in the heat exchanger duct downstream of the air-cooled heat exchanger relative to the flow of the cooling air from the air inlet to the air outlet, the cover including:
a plate extending across the heat exchanger duct and having one or more apertures extending through the plate;
a closure movable between an open position to fluidly connect the heat exchanger duct to the exhaust duct, and a closed position to fluidly disconnect the heat exchanger duct from the exhaust duct; and
a biasing member operatively connected to the closure biasing the closure toward the closed position with a biasing force, a first force generated on the closure by the source of pressurized fluid at the first pressure being greater than a second force generated on the closure by the source of pressurized fluid at the second pressure, the first and second forces opposing the biasing force, the biasing force being greater than the second force and less than the first force.

2. The aircraft engine as defined in claim 1, wherein the source of the pressurized fluid is a source of the flow of the cooling air and the closure includes one or more spring-loaded flaps covering the one or more apertures, the one or more spring-loaded flaps operable to open during the operating condition of the aircraft engine under pressure of the cooling air flowing through the one or more apertures.

3. The aircraft engine as defined in claim 2, wherein the biasing member includes one or more torsion springs operatively coupling the one or more spring-loaded flaps to the plate.

4. The aircraft engine as defined in claim 2, wherein a number of the one or more apertures is equal to a number of the one or more spring-loaded flaps.

5. The aircraft engine as defined in claim 1, wherein the cover includes a second plate slideably mounted relative to the plate and having one or more additional apertures extending through the second plate, the one or more additional apertures in the second plate operable to align with the one or more apertures in the plate in the open position and to overlap with the plate in the closed position.

6. The aircraft engine as defined in claim 5, wherein the source of the pressurized fluid is the gas flow of the aircraft engine and the biasing member includes an actuator exposed to the gas flow, the actuator operatively coupled to the cover to transition the cover between the open position during the operating condition of the aircraft engine and the closed position during the shutdown condition of the aircraft engine.

7. The aircraft engine as defined in claim 6, wherein the actuator is a spring-piston actuator.

8. The aircraft engine as defined in claim 6, wherein the actuator is disposed adjacent a bleed port of a compressor section of the aircraft engine.

9. The aircraft engine as defined in claim 1, wherein the plate has a cross-sectional radius equal to a cross-sectional radius of a wall of the exhaust duct relative to a central longitudinal axis of the aircraft engine.

10. A cover system for selectively allowing a flow of gas through a heat exchanger duct upstream of an exhaust duct in an aircraft engine, the heat exchanger duct including an air-cooled heat exchanger disposed therein, comprising:
a source of a pressurized fluid being at a first pressure during an operating condition of the aircraft engine and at a second pressure during a shutdown condition of the aircraft engine, the second pressure being lower than the first pressure;
a plate extending across the heat exchanger duct and having one or more apertures extending through the plate;
a second plate slideably mounted to the plate and having one or more additional apertures extending through the second plate;
a closure movable between an open position in which the closure allows the flow of gas through the one or more apertures into the exhaust duct, and a closed position in which the closure closes the one or more apertures; and
a biasing member operatively connected to the closure and biasing the closure towards the closed position with a biasing force;
wherein, during the operating condition of the aircraft engine, the first pressure of the pressurized fluid creates a first force acting against the biasing force of the biasing member, the first force being greater than the biasing force to urge the closure into the open position; and
during the shutdown condition of the aircraft engine, the second pressure of the pressurized fluid creates a second force acting against the biasing force, the biasing force being greater than the second force to bias the closure into the closed position;
wherein the one or more additional apertures in the second plate are operable to align with the one or more apertures in the plate in the operating condition of the aircraft engine and to overlap with the plate in the shutdown condition of the aircraft engine; and
wherein the source of the pressurized fluid is a gas flow of the aircraft engine and the biasing member includes an actuator exposed to the gas flow, the actuator operable to align the one or more apertures with the one or more additional apertures in the operational condition of the aircraft engine.

11. The cover system as defined in claim 10, wherein the actuator is a spring-piston actuator.

12. The cover system as defined in claim 10, wherein the actuator is disposed adjacent a bleed port of a compressor section of the aircraft engine.

13. The cover system as defined in claim 10, wherein the plate has a cross-sectional radius equal to a cross-sectional radius of a wall of the exhaust duct relative to a central longitudinal axis of the aircraft engine.

14. A method of operating an aircraft engine, comprising:
operating the aircraft engine in a powered mode that includes passing a gas through a heat exchanger toward an exhaust duct of the aircraft engine at a location downstream of a combustor of the aircraft engine; and
transitioning the aircraft engine from the powered mode into shut down, the transitioning including preventing exhaust gas from flowing from the exhaust duct towards the heat exchanger by actuating a component disposed fluidly between the heat exchanger and the exhaust duct of the aircraft engine.

15. The method as defined in claim 14, wherein operating the aircraft engine in the powered mode further includes preventing actuation of the component by flowing a pressurized fluid against a biasing force associated with the component, and wherein actuating the component includes decreasing a pressure of the pressurized fluid to a predetermined pressure indicative of the transitioning the aircraft engine from the powered mode into shut down.

* * * * *